United States Patent
Steiner et al.

(10) Patent No.: US 10,791,201 B2
(45) Date of Patent: Sep. 29, 2020

(54) SERVER INITIATED MULTIPATH CONTENT DELIVERY

(71) Applicant: Akamai Technologies Inc., Cambridge, MA (US)

(72) Inventors: Moritz M. Steiner, Sausalito, CA (US); Martin T. Flack, San Francisco, CA (US); Stephen L. Ludin, Mill Valley, CA (US); Mark C. Holland, Beverly, MA (US)

(73) Assignee: Akamai Technologies Inc., Cambridge, MA (US)

( * ) Notice: Subject to any disclaimer, the term of this patent is extended or adjusted under 35 U.S.C. 154(b) by 74 days.

(21) Appl. No.: 15/829,353

(22) Filed: Dec. 1, 2017

(65) Prior Publication Data

US 2018/0152545 A1     May 31, 2018

Related U.S. Application Data

(63) Continuation of application No. 14/252,640, filed on Apr. 14, 2014, now Pat. No. 9,866,655.

(60) Provisional application No. 61/973,134, filed on Mar. 31, 2014.

(51) Int. Cl.
*H04L 29/06* (2006.01)
*H04L 29/08* (2006.01)

(52) U.S. Cl.
CPC .......... *H04L 69/14* (2013.01); *H04L 67/1002* (2013.01); *H04L 67/1014* (2013.01); *H04L 67/1038* (2013.01)

(58) Field of Classification Search
CPC . H04L 69/14; H04L 67/1002; H04L 67/1038; H04L 67/1014
See application file for complete search history.

(56) References Cited

U.S. PATENT DOCUMENTS

| | | | |
|---|---|---|---|
| 6,751,673 B2 | 6/2004 | Shaw | |
| 6,963,914 B1 * | 11/2005 | Breitbart | ............. H04L 67/1095 709/225 |
| 7,274,658 B2 | 9/2007 | Bornstein et al. | |
| 8,169,916 B1 | 5/2012 | Pai | |
| 9,549,038 B1 * | 1/2017 | Anne | .................. H04L 67/2842 |

(Continued)

OTHER PUBLICATIONS

U.S. Appl. No. 14/252,640.
IDS Transmittal/MPEP 609 Letter submitted with this SB/08 form, dated Dec. 1, 2017, 2 pages.

*Primary Examiner* — Abdulkader M Alriyashi

(57) ABSTRACT

Described herein are—among other things—systems, methods, and apparatus for accelerating and increasing the reliability of content delivery by serving objects redundantly over multiple paths from multiple servers. In preferred embodiments, the decision to use such multipath delivery is made on the server side. A content server can modify or generate a given web page so as to invoke multipath, e.g., by injecting markup language directives and/or script instructions that will cause the client device to make multiple requests for a given object on the page. Preferably the multiple requests are made to separate content servers in separate points of presence. The teachings hereof may be advantageously implemented, without limitation, in intermediary servers such as caching proxy servers and/or in origin servers.

15 Claims, 9 Drawing Sheets

(56) References Cited

U.S. PATENT DOCUMENTS

| | | |
|---|---|---|
| 9,866,655 B2 | 1/2018 | Steiner |
| 2014/0229520 A1* | 8/2014 | Scott ...................... H04L 45/00 709/202 |
| 2015/0281367 A1 | 10/2015 | Nygren et al. |
| 2018/0262419 A1 | 9/2018 | Steiner et al. |

* cited by examiner

SERVER INITIATED MULTIPATH CONTENT DELIVERY

CROSS REFERENCE TO RELATED APPLICATIONS

This application is a continuation of U.S. patent application Ser. No. 14/252,640, filed Apr. 14, 2014 and titled "Server Initiated Multipath Content Delivery", which is based on and claims the benefit of priority of U.S. Patent Application No. 61/973,134 and titled "Server Initiated Multipath Content Delivery" and filed Mar. 31, 2014, the teachings of which are hereby incorporated by reference in their entirety.

This patent document contains material which is subject to copyright protection. The copyright owner has no objection to the facsimile reproduction by anyone of the patent document or the patent disclosure, as it appears in Patent and Trademark Office patent files or records, but otherwise reserves all copyright rights whatsoever.

BACKGROUND

Technical Field

This patent document generally relates to distributed data processing systems and to the delivery of content to users over computer networks.

Brief Description of the Related Art

The speed at which web pages load is of significant importance to website owners. If a page takes too long to load, end-users will have a negative experience, and may abandon the site. For online businesses, this can translate to poor customer service, lost traffic, and lost revenue.

Speed is important not only for web pages in a browser but also for other kinds of online content too, be it downloadable content (e.g., software), streaming multimedia, API data, or otherwise. With the continuing move to so-called 'cloud' services—including software-as-a-service and platform-as-a-service offerings—the importance of quick and reliable content delivery over the Internet only increases. Moreover, users' sensitivity to delay in loading web pages is increasing.

A wide variety of content delivery technologies have been developed to improve website speed and reliability, including distributed computer systems known as content delivery networks (CDNs) that are typically operated and managed by a service provider on behalf of participating content providers, who designate content to be delivered to end-users over the CDN infrastructure. A CDN typically comprises a coordinated set of content servers distributed around the Internet.

In such distributed systems, there is preferably a way to intelligently select the 'best' content server to use for delivering content to a particular end-user client. The 'best' content server is a qualitative notion that may take into account such metrics as the network distance and latency between the client and candidate content servers, server load, and whether a given content server is likely to have the requested content, among other things. The selection of a server can be achieved, for example, using an intelligent DNS system that returns an IP address for the selected content server in response to a request to resolve a given hostname, taking into account such factors as recited above. In this way, the end-user client device receiving this IP address is directed to send a content request to the selected server.

While these systems work well, delays in the path between a given content server and a client device vary; this can affect content delivery speed. In some cases, the choice of content server nearly always will be the same, because the "best" content server is so much closer to a client than all others. But in heavily deployed content delivery networks, there may be multiple candidate servers sufficiently near the client, and the "best" content server may be a function of variable "last-mile" conditions.

The teachings hereof provide, without limitation, systems, methods, and apparatus aimed at improving the delivery of content over computer networks by recognizing and exploiting variability in network conditions between a client device and content servers (sometimes referred to as the "last mile" of content delivery). The teachings hereof provide, without limitation, systems, methods and apparatus that enable the server side to address last mile issues by initiating certain procedures and techniques, preferably leaving the client device implementation unmodified. The foregoing are merely some pertinent aspects of the teachings of this disclosure, and are not intended to be limiting or to represent all of the features, or the necessary features, of systems, methods, and apparatus described herein. The teachings hereof provide a variety of benefits and improvements that will become apparent in view of this disclosure.

BRIEF SUMMARY

This patent document describes—among other things—systems, methods, and apparatus for accelerating and increasing the reliability of content delivery by serving objects redundantly over multiple paths from multiple servers. In preferred embodiments, the decision to use such multipath delivery is made on the server side. A content server can modify or generate a given web page to invoke multipath, e.g., by including markup language directives and/or script instructions that will cause the client device to make multiple requests for a given object on the page. Preferably the ensuing multiple requests are made to different content servers in different points of presence.

Issuing requests to multiple servers may involve some bandwidth overhead but, as described herein, it can provide measurable latency reductions and increase reliability of delivery, particularly over the so-called 'last mile' of content delivery. In some cases, multipath can be used selectively, based on various criteria as will be described herein.

The teachings hereof may be implemented without limitation in intermediary servers such as caching proxy servers, and/or in origin servers. For the case of intermediaries, described herein are techniques that facilitate upstream delivery network functions in the context of multiple requests for an object, such as a management of forward requests to an origin and/or coordination of follow-on actions that one of the servers is tasked to perform.

While in some embodiments clients may be modified with these specific teachings in mind, so that they natively perform or cooperate in certain aspects of multipath delivery, preferably clients operate in a conventional manner, using customary and widely available client software, and require little or no custom modification to participate in the techniques described herein.

The foregoing description merely refers to examples of the invention. It is not limiting and the teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

BRIEF DESCRIPTION OF THE DRAWINGS

The teachings hereof will be more fully understood from the following detailed description taken in conjunction with the accompanying drawings, in which.

DETAILED DESCRIPTION

The following description sets forth embodiments of the invention to provide an understanding of the principles of the structure, function, manufacture, and use of the systems, methods and apparatus disclosed herein. The systems, methods and apparatus described herein and illustrated in the accompanying drawings are non-limiting examples; the claims alone define the scope of protection that is sought. The features described or illustrated in connection with one embodiment may be combined with the features of others; such modifications and variations are intended to be included within the scope of the present invention. All patents, publications and references cited herein are expressly incorporated herein by reference in their entirety. Throughout this disclosure, the term "e.g." is used as an abbreviation for the non-limiting phrase "for example."

Figure 1:
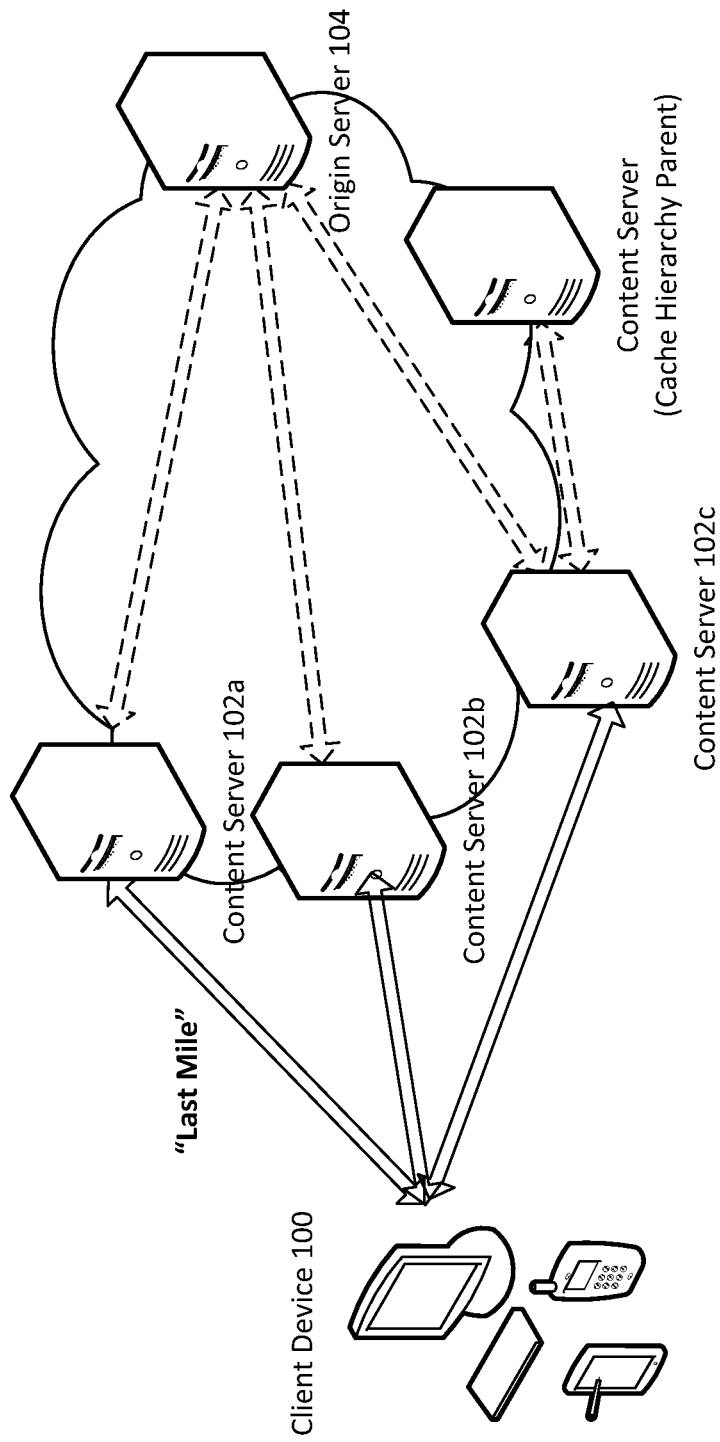
FIG. 1 is a schematic diagram illustrating one embodiment of a content delivery system with a client device, content servers, and an origin server.

FIG. 1 illustrates a system in one embodiment with an end user client device 100 and three content servers 102a-c that potentially can serve content to the client device 100. The end-user client device 100 is typically a desktop computer, laptop, smartphone, or the like, running a browser or other client application in a conventional manner and is operated by the end-user to obtain web page content from the content servers 102a-c.

The client device 100 and content servers 102a-c can communicate using known computer networking protocols, typically speaking HTTP at the application layer and using, among other things, the known TCP/IP networking stack for communications, familiarity with which is assumed and which is used herein for non-limiting illustrative purposes; however, the teachings hereof are not limited to any particular protocol or protocol suite.

The content servers 102a-c are typically computer machines with one or more microprocessors and associated hardware, preferably running a HTTP proxy server process that receives client requests for content, serves the requested content from local cache if available, and fetches content that is not in the cache (a so-called 'cache miss') from an origin server by issuing a request thereto, which is typically referred to as a forward request. For purposes of illustration, assume the content servers 102a-c are part of a deployed platform of servers in a content delivery network (CDN), the details of which will be described later in this document. (Note, however, having the content servers 102a-c be part of a CDN is not a limitation of the teachings of the current disclosure.) Each content server 102a-c may be one of a set of such content servers deployed at a particular location and in a particular data center. This is sometimes referred to as a 'region' or a 'point-of-presence.' For illustrative purposes, only one such content server 102a-c at each of three locations is shown in FIG. 1. An origin server 104, from which content servers 102a-c may fetch content, is also shown.

The content servers 102a-c preferably are located as close to the client as possible, preferably in end-user access networks (e.g., sometimes referred to as the network 'edge'). The content servers 102 are separated from the client device 100 by the so-called 'last mile' in the network. Though not shown in detail in FIG. 1, the 'last mile' may in fact contain a variety of network equipment such as routers, switches, gateways, NAT devices, firewalls, LAN devices, as well as a connection to user premises, typically via a modulated end-user access line, such as a DSL, cable, fiber link, or the like, and associated modems. If the client device is a mobile device, the last mile may include a wireless transmitter/receiver such as a WiFi device or cell tower. If the mobile is connecting via a cell tower, a variety of mobile operator equipment that is part of the radio access network/mobile core network may sit between the mobile device and the nearest content server.

Known mechanisms in use by commercial CDNs, such as an intelligent DNS or other request routing approach, can be used to direct the end user client to a selected content server 102a-c as a result of the end user client's DNS hostname lookup. The request routing can be based on a network map that indicates, at a given time, the 'best' content server to use for a particular client device. (Note that a client device typically makes a DNS request through its local DNS server, so the request routing system may base its decision on the location of the local DNS server on the assumption it is a good approximation for the location of the actual client device. With EDNS0 client subnet extensions, the actual client IP address can be used to make the decision.) As noted, the selection of a particular content server is preferably based on a variety of factors, including the network distance between the client and the, the connectivity between the two, the load on the content servers, whether a given content server is likely to have the requested content, and/or other factors. The mapping system takes in this kind of information (e.g., from the servers and network monitoring agents), determines the mapping, and provides it to the DNS or other request routing mechanism.

According to the teachings of this disclosure, the variability in latency to the content servers 102a-c can be exploited to improve the delivery of content. This variability may arise because of varying path latency between a content server and the client—e.g., because of buffering, processing, and other transient delays through aforementioned last-mile network devices. The term path is used to mean a communication path from one machine to another, either directly or through one or more intermediate network nodes. Variability also may arise because of transient processing delays at the content servers themselves. For example, a given content server may become momentarily loaded when processing requests for other clients, or performing some other function, and this delay may be enough that another content server may actually be the faster choice, at least at that specific instant when an object is requested by the client.

The particular latencies and conditions of the path between each content server 102 and client device 100 need not be predicted or monitored and the techniques described here do not rely on doing so. Rather, the variability in path latency can be exploited by requesting the desired content (e.g., a static website object such as an embedded image, CSS, script, inline HTML, etc.) multiple times in parallel from each of the content servers 102a-c. Preferably, the parallel requests are made at the same time or substantially so. And preferably, only the fastest result (that is, the object returned first) is used by the client device. Of course, any number of content servers greater than one might be used; for illustrative purposes FIG. 1 depicts three content servers with three paths to the client device.

For example, assume that the client device 100 requests a given image at the same time from each of content servers 102a, 102b, and 102c. Assume further that the image is first received from content server 102b and displayed to the user. The fastest server 102a-c could not necessarily have been known in advance. Moreover, the fastest server may change on a request-to-request basis, in accordance with the conditions of the last-mile network and the content servers themselves at the instant that the requests are made. Put another way, at the time of a given request, the network may experience momentary congestion and/or the content servers may be momentarily busy, and this may affect which is the 'best' content server.

Assume that the chances that the path to a given content server is congested, or that the given content server is busy at the time of a client request, is 1/N. By issuing a request for an object X times, making use of an independent set of resources each time, the chances that the response is delayed is reduced to $(1/N)^X$. It follows that even for small X, the chances of total failure of a request or a delay in the completion of a response is dramatically reduced. While the network resources for each of content servers 102a-c may not be completely independent (because the paths to two or more of them may share common elements), the underlying principle still holds in that multiple requests can reduce the overall expected latency and provide an increased level of fault tolerance.

In an embodiment, the system operates as follows, with reference to FIGS. 1 and 2. Assume the client device 100 initiates a DNS lookup via its local DNS server (or a public DNS server), and receives back an IP address associated with content server 102a. These are steps 200, 201 with sub-process 201a, and 202 in FIG. 2. Content server 102a thus represents the mapping system's choice for a content server. For descriptive convenience, content server 102a is referred to as the "primary" content server, while the other content servers 102b-c are referred to as "secondary" content servers.

In step 203, the client device sends a request for an HTML document to the primary content server 102a. The primary content server 102a executes a caching proxy operation, checking its local cache for the HTML document and, if not found or if expired, issuing a forward request to an origin server 104 to fetch the HTML document. (Step 204, with more detail shown in sub-process 204a.) Before sending the HTML document to the client, the primary content server 102a determines whether multipath should be used. (Step 206.) This determination may be based on a variety of factors, such as the bandwidth of the connection to the client, known characteristics of the client, and the like, as well as whether the particular content provider and HTML document is enabled for multipath via, e.g., metadata configuration settings. A more detailed description of potential criteria is provided later in this document. If multipath will not be used, then unmodified HTML is sent to the client as usual. (Step 207.) If multipath will be used, the primary content server 102a changes the HTML document so that the client will request the same object from multiple different content servers. (Step 210.) This is achieved, in one embodiment, by modifying the HTML to have multiple references to the same object.

For example, assume the HTML contains an image tag with a universal resource locator (URL) for an embedded image, as follows:

```
<img src="http://www.example.net/foo/akamai350.jpg" width="665" height="384">
```

The above HTML can be rewritten to three image tags with three URLs:

```
<img id="image1" src="http://multipath1.example.net/foo/akamai350.jpg" width="665" height="384" class="hide" onload="mkvis1( )">
<img id="image2" src="http://multipath2.example.net/foo/akamai350.jpg" width="665" height="384" class="hide" onload="mkvis2( )">
<img id="image3" src="http://multipath3.example.net/foo/akamai350.jpg" width="665" height="384" class="hide" onload="mkvis3( )">
```

Note that it is not necessary to change the original hostname or URL. For example, the original image tag could be left with the original hostname 'www.example.net' and in fact with the same URL, with the multipath2 and multipath3 hostnames being added. (However, this latter approach has a downside in some cases, as a request to the same subdomain as the base HTML page may result in that particular image request on the original hostname being queued behind other objects being requested from the same subdomain, thus distorting the 'race.' State-of-the-art browsers using HTTP/1.1 typically open between 4-8 simultaneous TCP/IP sockets to a server, so if there are more assets to be fetched, they queue. This may result in the original hostname image losing a race to the multipath-specific subdomains even when it would have won the race had it been able to go to the network immediately. The foregoing assumes that image loading is being handled by native browser features and not overridden by AJAX. But with AJAX, accommodations could be made to time image fetching separately, thus avoiding the foregoing downside.)

Regardless of the particular form, the multiple hostnames (which are sometimes referred to herein as the "multipath hostnames") preferably resolve to different content servers than the original hostname. In this example, the multipath hostnames point to the primary content server 102a and the two secondary content servers 102b-c. This sets up multipath as it will cause the client to request the image object from each of three different content servers. This example invokes three requests and three paths, but as long as more than one path is invoked, there is the potential for benefit; any number of hostnames and/or content servers greater than one can be used to obtain a benefit. Generally, the higher the number of paths (assuming at least some path independence), the greater the potential for reducing latency, though the tradeoff is higher bandwidth consumption.

In addition to providing multiple references to the same object, the primary content server 102a preferably inserts a script (e.g., Javascript) to be executed by the client (e.g., by the browser rendering engine). Each of the image tags, it will be noticed, contain an attribute pointing to a function in the script. The script preferably causes the client device to display only the first image received, and discard the others. In effect, the script sets up a race between the content servers. An example of a suitable such 'race' script and supporting stylesheet information is provided below:

```
<! -- Example 'race' script with stylesheet info -- >
<script>
function mkvis1( ) {
    if (image2.className==='hide' || image3.className==='hide')
    {
        image1.className='show';
        var im2 = document.getElementById('image2');
        im2.parentNode.removeChild(im2);
        var im3 = document.getElementById('image3');
        im3.parentNode.removeChild(im3);
    }
}
function mkvis2( ) {
    if (image1.className==='hide' || image3.className==='hide') {
        image2.className='show';
        var im1 = document.getElementById('image1');
        im1.parentNode.removeChild(im1);
        var im3 = document.getElementById('image3');
        im3.parentNode.removeChild(im3);
    }
}
function mkvis3( ) {
    if (image1.className==='hide' || image2.className==='hide') {
        image3.className='show';
        var im1 = document.getElementById('image1');
        im1.parentNode.removeChild(im1);
        var im2 = document.getElementById('image2');
        im2.parentNode.removeChild(im2);
    }
}
</script>
<style>
    .show {
    visibility: visible;
    }
    .hide {
    visibility: hidden;
    }
</style>
```

In the above example, the CSS attribute "visibility", which is set to "visible" and "hidden", could alternatively be coded as "display" set to "inline" or "none" respectively. Also, the use of CSS class to effect visibility could also be coded as direct manipulation of CSS attributes. For implementation purposes, the uniqueness of image identifiers and class names would be promoted by using a namespace prefix for generated and injected code such as this. The removal of objects from the DOM is not necessary for visual reasons if the "display: none" technique is employed, but doing so is preferably in some implementations because it results in a cleaner DOM in the event that over scripts on the page need to subsequent DOM walking or manipulation.

Not all object references in a given HTML document are necessarily converted for multipath. Preferably, the primary content server determines which embedded object references in the HTML should be modified to invoke multipath, as indicated in FIG. 2 by step 208. The primary content server may convert a subset of references corresponding to enabled object types that are likely to be cacheable, such as images, CSS, Javascript or other client-executable scripts, and the like. Tags with URLs that indicate non-cacheable content (e.g., URLs with query parameters, URLs pointing to active server pages, PHP, and/or other server-side script invocation) are preferably not rewritten to invoke multipath to the extent it is undesirable for the origin server to receive multiple forward requests, which would lead to extra load and processing demand on the origin server. Further, in an embodiment, only references for objects that will appear above-the-fold when rendered are converted to multipath references, and object references farther down the page are left unmodified. In another embodiment, the treatment for multipath is applied to selected images, for example those that are considered prominent in the web page design, such as a the site 'logo' or 'hero' images that are the most important to show to the user (to be contrasted with supporting images such as icons or thumbnails).

In an alternate embodiment, an "AJAX approach" can be used to invoke multipath, e.g., by removing the HTML tags for the images (or other embedded objects for which multipath is desired) and moving those requests into a script (where the XMLHttpRequest method is used to invoke them). Generalizing, instead of modifying the HTML to contain explicit and discrete multiple references to an object and invoke multipath, a given object reference can be replaced with a script that will make calls to multiple URLs, requesting the object from each of multiple servers. Preferably, the aforementioned script is part of 'race' script.

Figure 2:
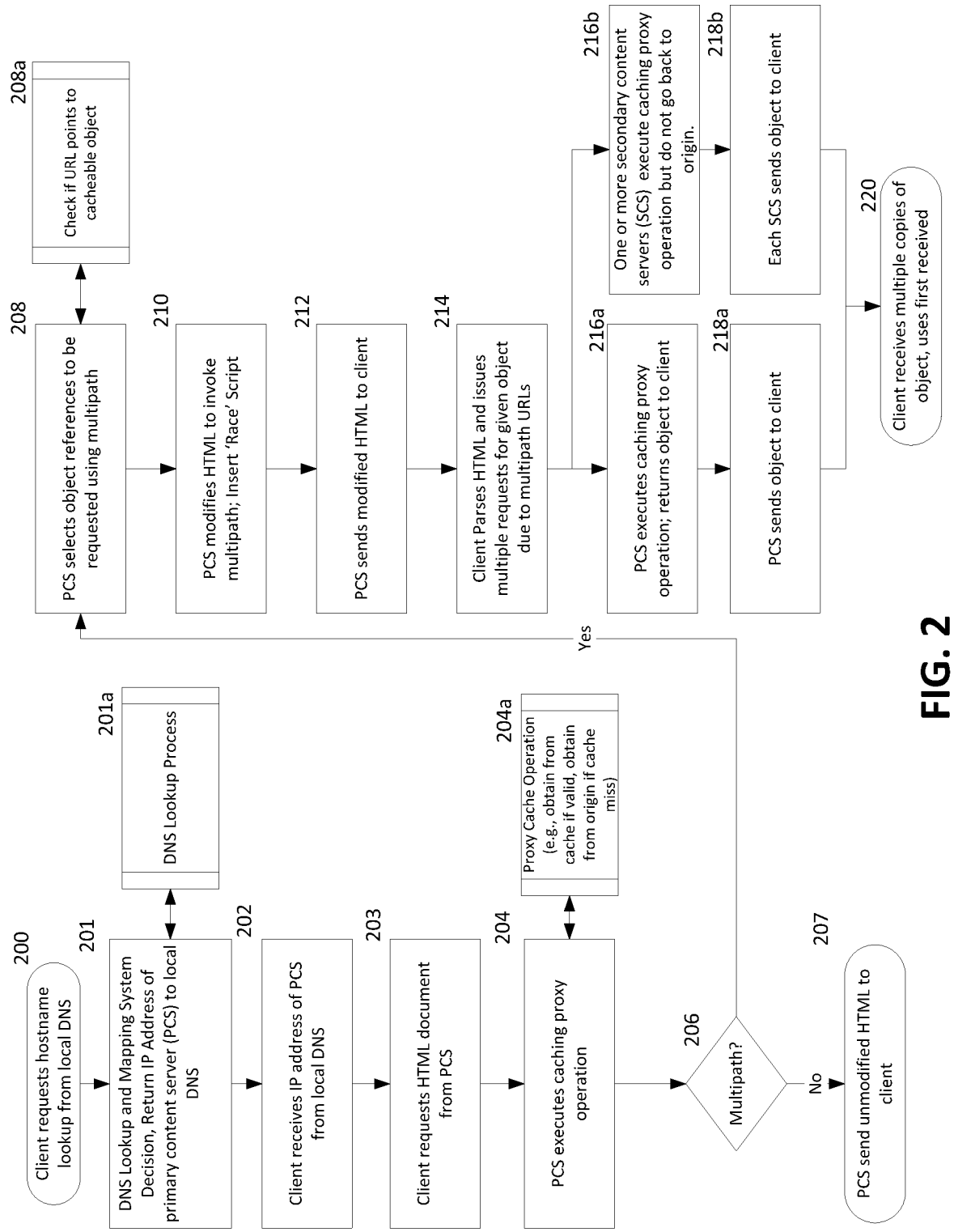
FIG. 2 is one embodiment of logical flow to be executed with respect to the system shown in FIG. 1 for multipath delivery of objects.

In step 212 of FIG. 2, the primary content server 102a sends the modified HTML to the client device. The client device parses the HTML and JavaScript and issues requests to obtain the object from each of the multipath URLs. (Step 214.) The primary content servers 102a and secondary content servers 102b-c each receive a request for the image object and process the request in a caching proxy operation. (Step 216a and 216b.)

In a preferred embodiment, the object requests sent to the secondary content servers 102b-c contain a 'hint.' Upon receiving the hint, the secondary content servers 102b-c refrain from going forward to origin if the requested object is not available in their cache. As a result, only the primary content server 102a will go forward if needed. This technique avoids potential problems with having multiple content servers requesting the same content from the origin. In addition to suppressing the forward request operation, the hint can also indicate to a secondary content server that it may safely ignore the request. For example, a secondary content server may decide to ignore the request if it is heavily loaded. Even if all secondary content servers ignore the request, the primary content server will still be tasked with responding.

The 'hint' may be implemented in a variety of ways. In one embodiment, the hint is placed in a request header field in the client's request. Javascript is injected into the page; the Javascript overrides the loading of images, using e.g., XMLHttpRequest to fetch the images. Then, the client's request header can be specified using a Javascript headers property to indicate a custom header with the hint, for example. The hint could also be implemented using a URL parameter. In yet another embodiment, the multipath URLs could be arranged to essentially reflect the hint in a domain or subdomain. For example, continuing the example from above, the hostnames of the three URLs could rewritten as follows:
primary.multipath1.example.net
secondary.multipath2.example.net
secondary.multipath3.example.net In other words, each multipath hostname can have two versions, essentially a 'primary' and 'secondary' subdomain: primary.multipath1, secondary.multipath1, primary.multipath2, secondary.multipath2. The DNS resolution can ignore the primary/secondary subdomain distinction; both subdomains can be on the same map and produce the same result. However, when a content server receives the client request for the object, the HTTP Host header will include the hostname and thereby indicate whether the content server is considered primary or secondary. The result in the example above indicates to the multipath 1 server that it is primary and that the multipath 2 server is secondary.

Multiple types of hints (e.g., meaning different things) can be employed. For example, a hint can include a value indicating various options, such as: (1) do not go forward at all; (2) go forward to cache hierarchy but not to origin; (3) ignore if needed, and so on.

Returning to FIG. 2, at step 218a-b, the primary content server 102a and some or all of the secondary content servers 102b-c send the requested object to the client device. The client device, executing the inserted JavaScript, displays only the first-received image and discards the others. (Step 220) In some embodiments, upon receiving the first object, the client device can cancel the remaining requests. In HTTP/2.0 (as of draft-11), this can be accomplished with a CANCEL error code in a RST_STREAM frame.

Multipath Hostnames and Diverse Network Paths

Preferably, each of the multipath hostnames points not only to different content servers, but to content servers in data centers or points of presence (PoPs) that are separate from one another in network topology and/or geography terms. In some cases, the content servers may belong to different entities, e.g., different CDNs or a mixture of a CDN and its customer's servers.

Having the multipath hostnames point to servers in different data centers reduces path overlap in the paths between the client and the content servers. It is advantageous to maximize path diversity and independence across the set of content servers from which the client will retrieve the object. To accomplish this, the hostnames in the multipath URLs can be associated with non-overlapping maps. For example, map 1 can include hostname multipath1.example.net and correspond to a set of content servers including server 102a in FIG. 1. Map 2 can include hostname multipath2.example.net and correspond to a set of content servers including server 102b in FIG. 1. Map 3 can include hostname multipath3.example.net and correspond to a set of content servers including server 102c in FIG. 1. The sets of content servers in each map are mutually exclusive in this embodiment, so that when the three hostnames are resolved, the 'best' server in each map is selected and these represent three different servers.

Multipath Criteria

There are a variety of criteria that can be used by the content server to decide whether to use multipath. One is available bandwidth to the client. Issuing multiple requests for a given object will consume more bandwidth in the effort to reduce latency. Therefore well-connected users are generally better suited to use multipath than poorly-connected users. The bandwidth of a user can be determined by consulting databases that store bandwidths for IP addresses (or on a subnet, or other IP block, basis), the bandwidths reflecting periodic measurements of the network. Alternatively, the instantaneous bandwidth at or near the time of request can be determined by observing the data rate during the delivery of the base HTML and storing the value at the server or in a cookie. Examples of in-session measurements of data rate are described in U.S. Pat. No. 8,346,956, the teachings of which are hereby incorporated by reference in their entirety.

The nature and characteristics of the client device can information the decision on whether to use multipath. For example, the HTTP user agent header field can be used to identify the particular client device by make and model and thus identify whether it is a mobile device versus, for example, a desktop computer. If the client is a mobile phone subject to a data cap on use and/or a relatively low-bandwidth connection, it may not make sense to use multipath.

Identifying the particular client device by make/model may also reveal whether it is a multi-homed device. Multipath can offer a benefit to multi-homed devices because multi-homed devices can utilize multiple interfaces. For example, a mobile device with a WiFi connection to one network and a cellular connection to another network can use multipath to issue simultaneous requests over both networks, resulting in very high path diversity.

Preferably, assuming a multi-tenant platform of content servers, configuration settings at a content server designate which content providers are enabled to use multipath and the objects for which multipath is enabled. Hence, a content provider of a CDN can configure highly-cacheable objects for multipath while disabling the functionality for dynamic objects. The configuration mechanism may employ a metadata control file approach, which is described later in this document in the context of an example CDN metadata infrastructure.

Remembering the Winning Content Server

In some embodiments, the 'winning' content server in the multipath 'race' is remembered by the client device and/or the servers. This information can be used in a variety of ways.

For example, if the client remembers which content server won, it can make future requests only to the winning content server for some period of time (perhaps a few seconds). This avoids the overhead of making multiple requests. To have the client remember the winning server, the 'race' script inserted by the content server into the HTML can also include instructions to set a variable to record the winning content server. Then, the script emits requests (e.g., using XMLHttpRequest objects) for other objects on the page, but only for the content server set in the variable. This approach assumes the "AJAX approach" for invoking multipath where the primary content server, when modifying the page in the first instance, removes the tags for those images or other embedded objects for which multipath is desired and moves those requests into a script (where the XMLHttpRequest method is used to invoke them). In another implementation, document.write scripts could be used to emit one of three tags depending on a global variable; because such scripts are typically blocking in a browser, this approach is best suited for scenarios with only one or a few multipath objects.

In an alternate embodiment, the client remembers the winning content server in a cookie. This enables the identity of the winning content server to be used in initiating requests for embedded objects on other pages in the given session.

If each content server remembers whether or not it won, they can transmit this information upstream to the mapping system, so as to effect a feedback loop. Over a period of time, the win/lose information may show that one or more of the secondary content servers are 'winning' with some regularity. This trend may be used by the mapping system to determine whether it should stop mapping the client device (or more particularly, a given IP address block of which the client device is a member) to the current primary content server and instead map to one of the secondary content servers, in effect designating one of the secondary content servers to become the primary.

Content servers can be configured to know whether they win the 'race' based on receipt of the CANCEL error code in HTTP/2.0. If a content server receives a CANCEL code, it knows it lost; if no CANCEL code is received, then it knows it won.

Follow on Actions

For some URLs or domains served by the content servers 102a-c, there may be configuration or code in place to trigger certain follow-on actions when serving a request. Because instrumentation for multipath requests causes the request to appear at more than one content server, it may result in those follow-on actions triggering multiply, which may be undesirable. Examples of follow-on actions are (a) creating a separate HTTP request from the content server to an origin server in order to serve as a delivery receipt message to an origin server to evidence the object delivery transaction, (b) decrementing a tally being monitored against a quota of allowed hits or impressions for some current time period for an account holder or developer whose credentials were included in the original request (but whose user or customer may be the one initiating the actual request), (c) counting the request towards throttling controls or reporting details of the request to a security subsystem that would score certain types of repetition in requests negatively, or (d) delivery of a log/billing record, e.g., to a subsystem in a content delivery network. The 'hint' described earlier for suppression of forward requests to origin can be used for this purpose, that is, the hint can be used to suppress certain follow-on actions at the secondary servers receiving it, allowing the primary content server alone to perform the follow-on action.

However, the primary content server may not win the multipath race, or it may experience a failure, or the request itself may fail due to the network problem such that it never reaches the primary content server. Because of such possibilities, the performance of the follow-on action is not reliable. The following is an embodiment of a logical flow for more reliably effecting a follow-on action at least once and once only:

A content server acting as primary performs follow-on actions.

If a content server acting as secondary would have follow-on actions to perform, it suppresses the actions (based on the hint received from the client). However, the secondary content server itself returns a follow-on suppression hint (e.g., a response header) to the client indicating that it suppressed a given follow-on action.

If the client sees that the primary request succeeded (e.g., HTTP 200 OK with requested content), regardless of whether it was the winner, it does not have to consider any of these follow-on suppression hints. Seeing the primary succeed may be subject to a reasonable timeout.

If no follow-on suppression hints are received, then again no special action is necessary by the client. Further, if a secondary request wins, the other requests could be canceled if the underlying protocol is amenable (HTTP/2.0 for example).

If a secondary request wins and the follow-on suppression hint is present, then the client can either wait for the primary request to arrive, while possibly canceling any other secondary request, or cancel the remaining requests and process a callback to the winning content server as described below.

If the primary request fails for some non-application fatal reason (e.g., a content server denies socket connection because it is out of service) then the client processes a callback to the winning secondary server.

Callback: an HTTP request is initiated by the client back to the winning content server, carrying an echo of the original follow-on suppression hint (so that data important to the content server can be returned, similar to how a cookie works), to which the winning content server reacts by performing the follow-on actions that were originally required by the winning request but it had suppressed. The follow-on actions are performed to the extent that doing so is possible at this point in time. The winning content server preferably does not actually serve the content, but rather does a simple HTTP 200 OK response for success, or alternatively an HTTP 202 Accepted, or HTTP 204 to underscore that there is no payload in the response, or other suitable response.

Experimental Measurements

Figure 3:
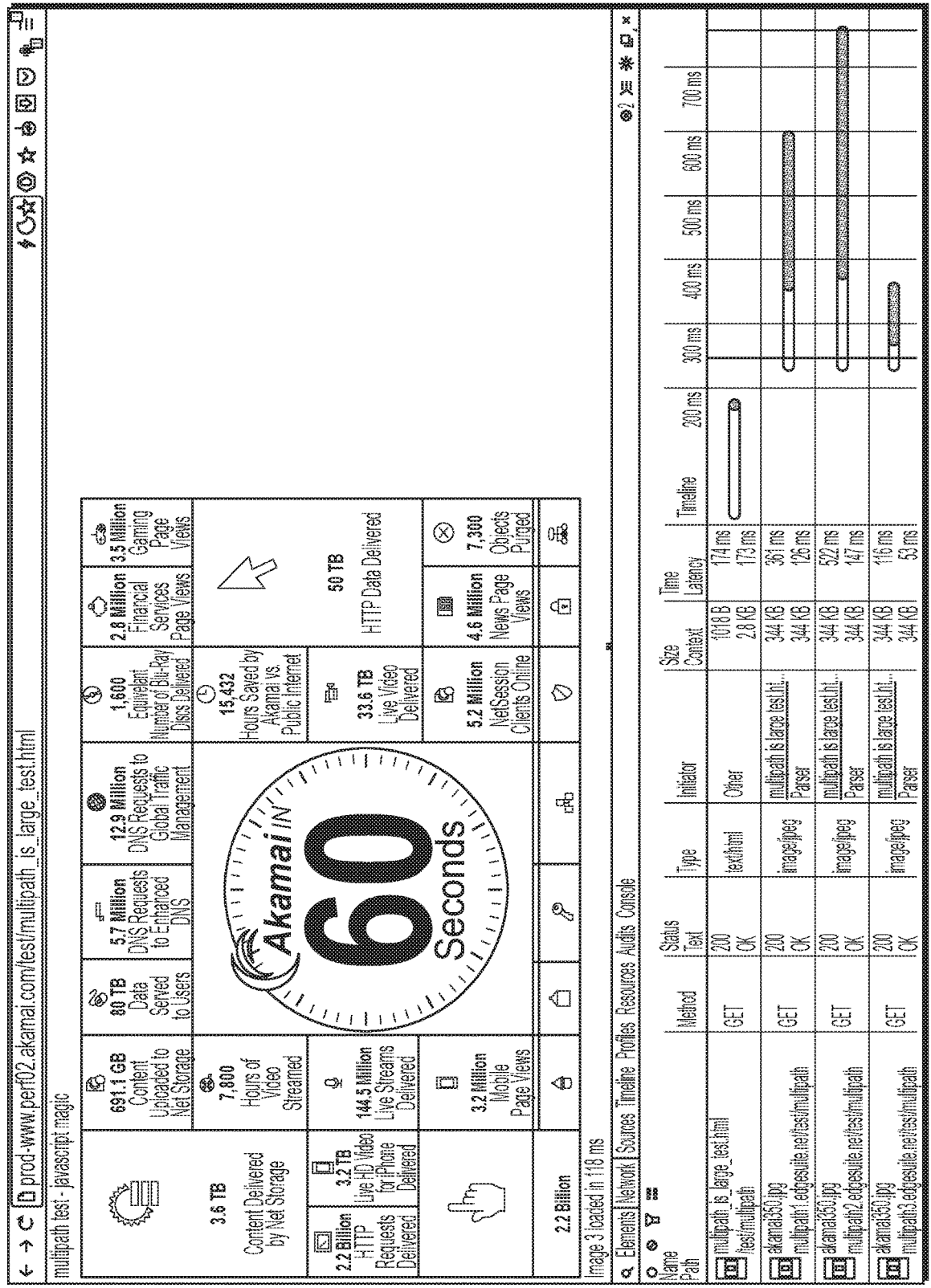
FIG. 3 is a screenshot illustrating test measurements for retrieval of an image object from three content servers, each over its own network path.

FIG. 3 is a screenshot of a test web page with a single image "akamai350.jpg" that was modified to have three image tags all pointing to copies of "akamai350.jpg" on different servers, and the race script similar to that provided earlier, so that the image would be requested from three different servers but only the winning image displayed. The bottom of FIG. 3 shows the resulting waterfall diagram, with images 1, 2, 3 having been requested from multipath1.edgesuite.net, multipath2.edgesuite.net, and multipath3.edgesuite.net, respectively.

In the screenshot one can see that the third image loads much faster than the two others, and that only the third image is displayed, long before the two others are loaded. In fact in this particular instance the image has finished loading from server 3 even before the first byte is received from another server. Assume the user had requested the image only from server 1 and not additionally from server 2 and server 3—the image (and by extension the web page) would have loaded more than 200 ms slower.

Figure 4A:
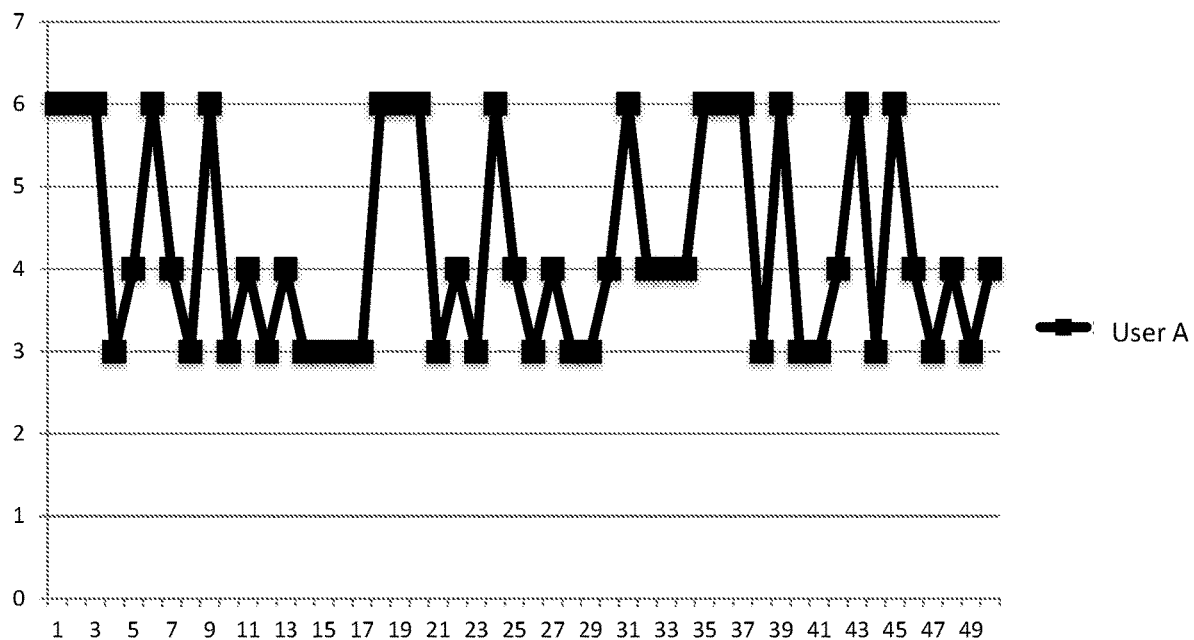
FIG. 4A is a chart showing the results of a test to find the fastest of three content servers over time for client 'A'.
Figure 4B:
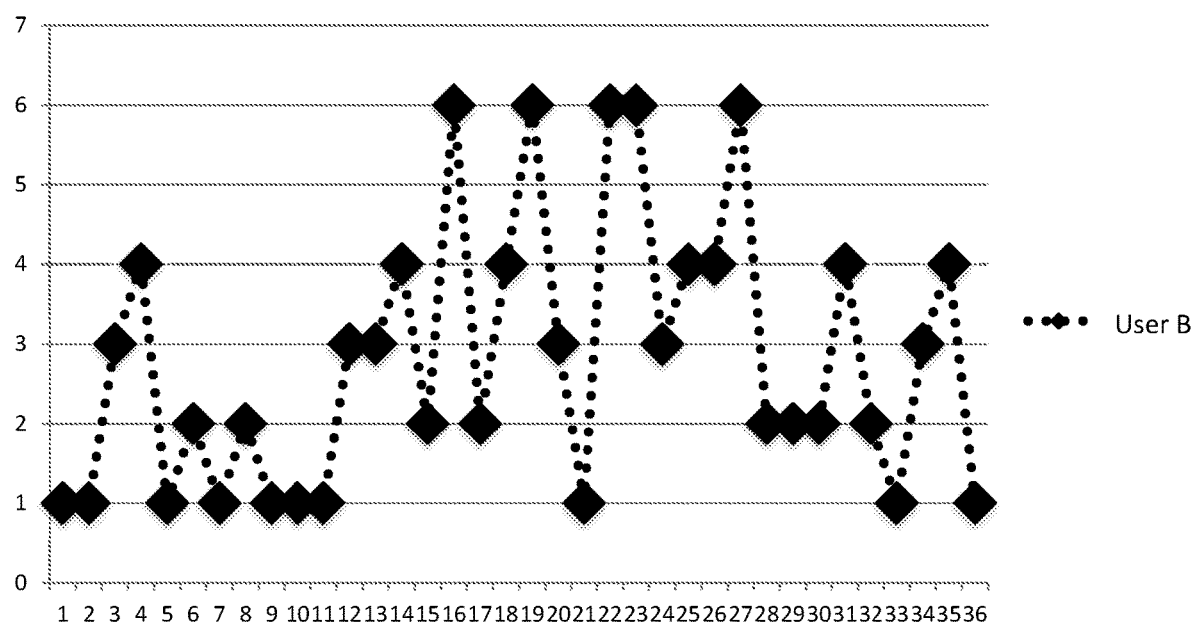
FIG. 4B is a chart showing the results of a test to find the fastest of three content servers over time for client 'B'.
Figure 4C:
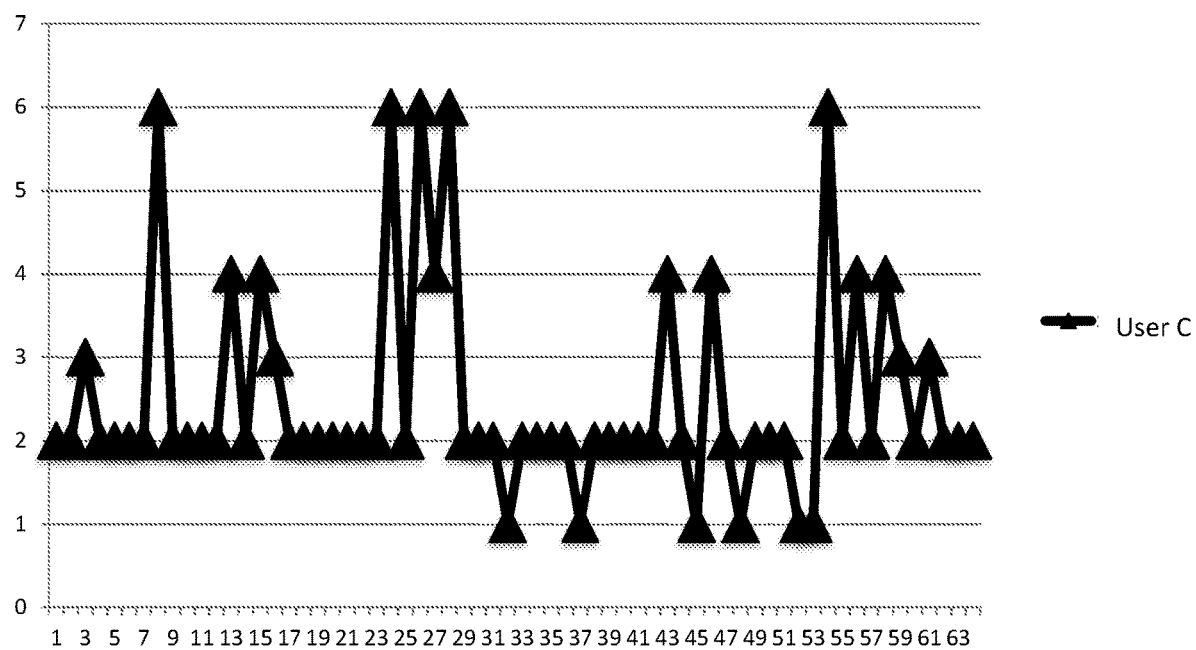
FIG. 4C is a chart showing the results of a test to find the fastest of three content servers over time for client 'C'.

FIGS. 4A-C are charts plotting a time series of fastest of six servers for three users (FIG. 4A corresponds to User A, FIG. 4B for User B, and FIG. 4C for User C). The time is on the x-axis and the identifier of the fastest server on the y-axis. The chart shows that for a given user, the 'fastest' server varies over time. The multipath techniques described herein can be used to exploit this observation.

Alternate Embodiments

The above-described teachings may be extended, varied, and implemented in a variety of ways. Provided below are some examples.

Many HTML documents employ active page technologies like JavaScript and XHTML, where the object requests are made with an AJAX call. To modify an HTML document for multipath where the HTML uses AJAX, an out of band analysis approach can be employed in which the content server sends the page to an out of band machine to analyze the page (e.g., fire the AJAX and perform deep analysis to find asynchronous server requests and the like). The out of band machine can create regex-based search and replace instructions for the content servers 102a-c indicating how to modify various components on the page so that multiple requests for the same object are issued. The next time that the page is seen by the content server, the search and replace instructions are ready and can be applied quickly by the content server. A suitable system for out-of-band analysis and modification of web pages is described in U.S. Patent Publication No. 2011/0314091, the teachings of which are hereby incorporated by reference in their entireties.

The modification of HTML does not need to take place in proxying content servers. In some embodiments, the techniques described herein are implemented at the origin server (e.g., in the web server code itself, or in a module that sits in front of the origin server). The teachings hereof can thus be implemented in any intermediary device, module or component, and also apply to the scenario in which no intermediary is present. In other words, web pages can be authored for multipath, with appropriate 'race' and other scripts, and delivered as such from an origin server. The origin server serving the page would represent the primary server in data center A, with the additional multipath hostnames pointing to secondary servers in data centers B and C, respectively (assuming a three-path system).

The teachings hereof are not limited to HTML. In embodiments, XHTML, DHTML, WML, SGML, XML and other markup languages capable of expressing references to objects that can be requested over a network (e.g., with URLs) can be used. Regardless of language, the references to the object can be rewritten to multiple references to invoke multipath action in the client.

In some embodiments, HTTP range requests can be used so that the client requests portions of the same object over the multiple paths, rather than the same object multiple times. The race can be used in conjunction with the range requests to further advantage. For example, consider a given 500 kB object. The multipath race can be performed with respect to the first 50 kB chunk of the object, and the winning server/path remembered. Then, the client can request the remaining chunks from the winning content server/path.

The use of multipath is not limited to a scenario with multiple content servers. In other words, in some embodiments, multipath is invoked between a single client and a single server. One way to accomplish this is to have the client use one interface for one path (e.g., WiFi), and another interface for another path (e.g., cellular network). A conventional client device may be modified to perform this function, as outlined in the next section. Another way to accomplish this is to provide multipath hostnames resolving to different IP addresses that nevertheless point to the same content server. This is useful where content server has connectivity to two or more networks and has an IP address for each interface.

While various non-limiting embodiments have been described above, those skilled in the art will recognize natural extensions, variants and alternatives that fall within the scope and spirit of the teachings hereof.

Client Device Modifications

As noted previously, preferably clients operate in a conventional manner, using customary and widely available client software without modification. However, in some embodiments clients may be specifically programmed so that they natively perform or cooperate in certain aspects of multipath delivery described herein. For example, some or all of the functionality present in the scripts can be moved into a native solution by having an appropriately coded client application, including a browser with appropriate plugin or extension. Further, the generation and formatting of hints can also be defined or assisted by cooperating logic natively programmed in to the client device, either in hardware or a client application or operating system. In other embodiments, as outlined herein, functionality can be implemented using a client application's support for AJAX technologies, such that the client device is programmed to operate as set forth in the AJAX instructions.

Content Delivery Networks

The subject matter hereof may be implemented in a distributed computing system known as a CDN, with the content servers 502a-c being CDN content servers, preferably each in different points of presence (which are referred to as 'regions' in some CDN architectures).

Typically, a CDN is operated and managed by a service provider. The service provider typically provides the content delivery service on behalf of third parties. CDN services are typically provided on behalf of content providers who essentially share the CDN infrastructure. In addition to service-oriented model, CDNs may also provide content delivery software and hardware to customers—such as telecommunication network carriers and internet service providers, who wish to build or augment their own delivery infrastructure.

Figure 5:
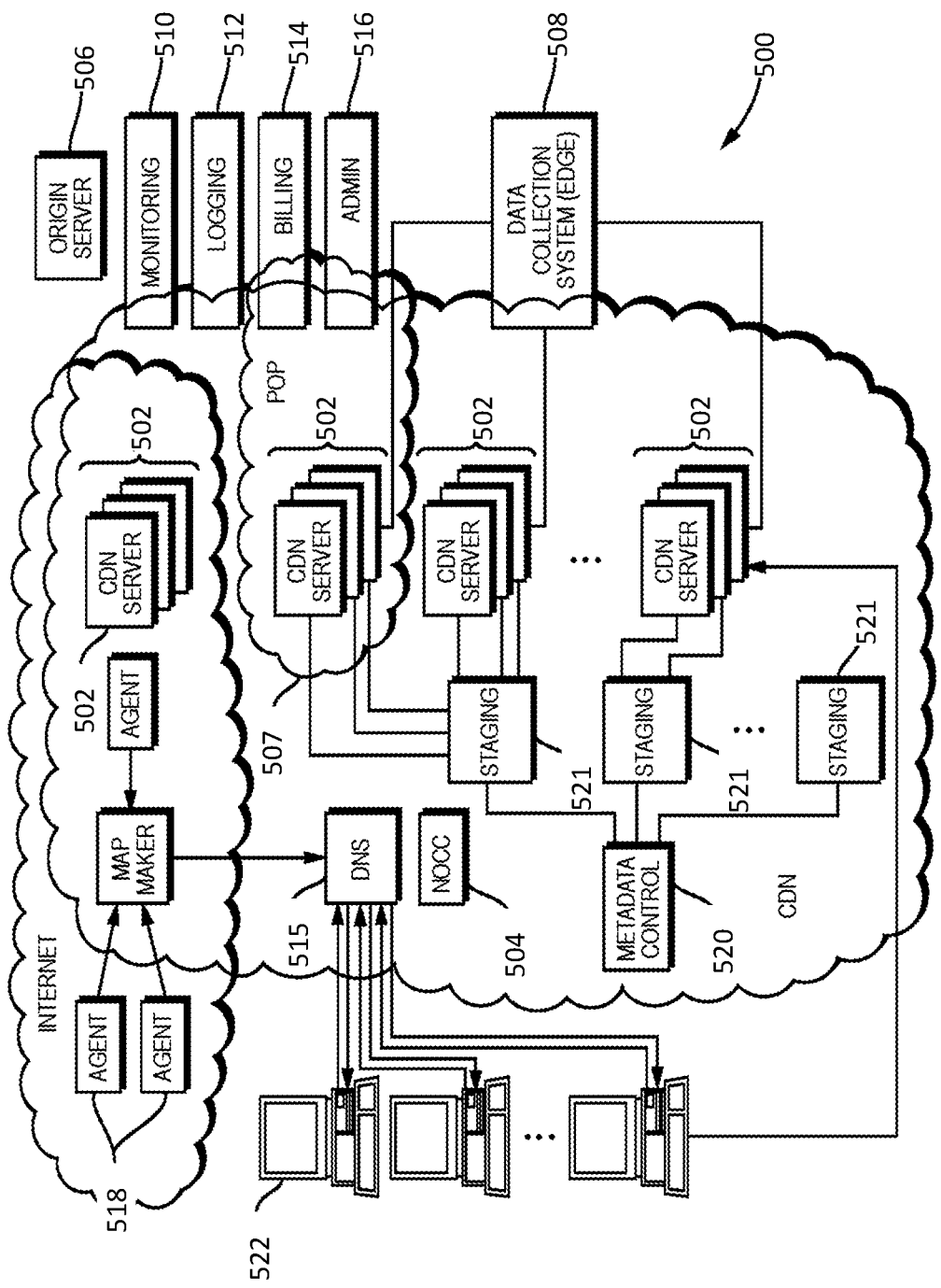
FIG. 5 is a schematic diagram illustrating one embodiment of a distributed computer system configured as a content delivery network (CDN)

FIG. 5 is an illustration of a CDN architecture with a set of content servers 502 distributed around the Internet. Typically, most of the servers are located near the edge of the Internet, i.e., at or adjacent end user access networks. A network operations command center (NOCC) 504 may be used to administer and manage operations of the various machines in the system. Third party sites affiliated with content providers, such as web site 506, offload delivery of content (e.g., HTML or other markup language files, embedded page objects, streaming media, software downloads, and the like) to the distributed computer system 500 and, in particular, to the CDN's content servers 502. Such servers may be grouped together into a point of presence (PoP) 507 at a particular geographic location.

The CDN content servers are typically located at nodes that are publicly-routable on the Internet, within or adjacent nodes that are located in mobile networks, within or adjacent enterprise-based private networks, or in any combination thereof.

For cacheable content, CDN servers typically employ on a caching model that relies on setting a time-to-live (TTL) for each cacheable object. After it is fetched, the object may be stored locally at a given CDN server until the TTL expires, at which time is typically re-validated or refreshed from the origin server 506. For non-cacheable objects (sometimes referred to as 'dynamic' content), the CDN server typically returns to the origin server 506 time when the object is requested by a client. The CDN may operate a server cache hierarchy to provide intermediate caching of customer content in various CDN servers closer to the CDN server handling a client request than the origin server 506; one such cache hierarchy subsystem is described in U.S. Pat. No. 7,376,716, the disclosure of which is incorporated herein by reference.

Although not shown in detail in FIG. 5, the distributed computer system may also include other infrastructure, such as a distributed data collection system 508 that collects usage and other data from the CDN servers and passes that data to other back-end systems 510, 512, 514 and 516 to facilitate monitoring, logging, alerts, billing, management and other functions. Distributed network agents 518 monitor the network as well as the server loads and provide network, traffic and load data to a DNS query handling mechanism 515. A distributed data transport mechanism 520 may be used to distribute control to the CDN content servers.

Figure 6:
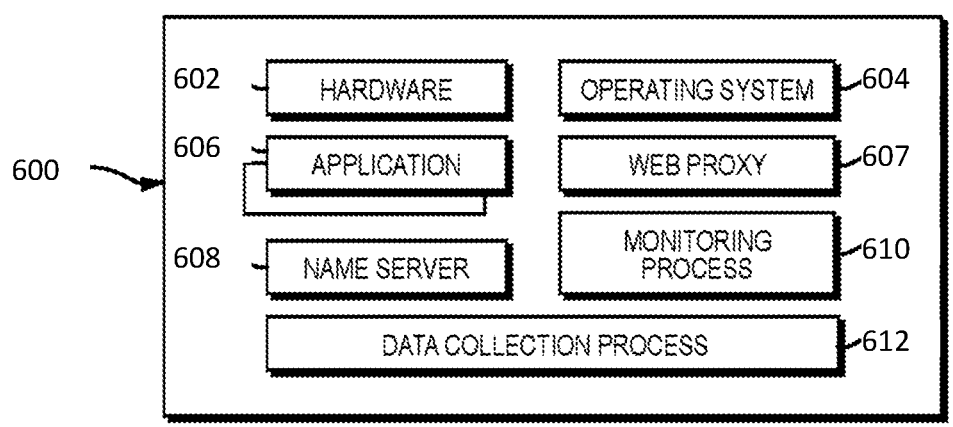
FIG. 6 is a schematic diagram illustrating one embodiment of a machine on which a CDN server in the system of FIG. 5 can be implemented; and, FIG. 7 is a block diagram illustrating hardware in a computer system for use in implementing the teachings hereof.

As illustrated in FIG. 6, a given machine 600 in the CDN comprises commodity hardware (e.g., a microprocessor) 602 running an operating system kernel (such as Linux® or variant) 604 that supports one or more applications 606. To facilitate content delivery services, for example, given machines typically run a set of applications, such as an HTTP proxy 607, a name service 608, a local monitoring process 610, a distributed data collection process 612, and the like. The HTTP proxy 607 (sometimes referred to herein as a global host or "ghost") typically includes a manager process for managing a cache and delivery of content from the machine. For streaming media, the machine may include one or more media servers, such as a Windows® Media Server (WMS) or Flash server, as required by the supported media formats.

A given CDN content server may be configured to provide one or more extended content delivery features, preferably on a domain-specific, content-provider-specific basis, preferably using configuration files that are distributed to the CDN servers using a configuration system. A given configuration file preferably is XML-based and includes a set of content handling rules and directives that facilitate one or more advanced content handling features. The configuration file may be delivered to a CDN server via the data transport mechanism 520. U.S. Pat. No. 7,240,100, the contents of which are hereby incorporated by reference, describe a useful infrastructure for delivering and managing CDN server content control information and this and other control information (sometimes referred to as "metadata") can be provisioned by the CDN service provider itself, or (via an extranet or the like) the content provider customer who operates the origin server. More information about a CDN platform can be found in U.S. Pat. Nos. 6,108,703 and 7,596,619, the teachings of which are hereby incorporated by reference in their entirety.

In a typical operation, a content provider identifies a content provider domain or sub-domain that it desires to have served by the CDN. When a DNS query to the content provider domain or sub-domain is received at the content provider's domain name servers, those servers respond by returning the CDN hostname (e.g., via a canonical name, or CNAME, or other aliasing technique). That hostname points to the CDN, and it is then resolved through the CDN name service. To that end, the CDN name service returns one or more IP addresses. The requesting client application (e.g., browser) then makes a content request (e.g., via HTTP or HTTPS) to a CDN content server associated with the IP address. The request includes a host header that includes the original content provider domain or sub-domain. Upon receipt of the request with the host header, the CDN content servers checks its configuration file to determine whether the content domain or sub-domain requested is actually being handled by the CDN. If so, the CDN content servers applies its content handling rules and directives for that domain or sub-domain as specified in the configuration. These content handling rules and directives may be located within an XML-based "metadata" configuration file, as mentioned previously.

The CDN platform may be considered an overlay across the Internet. Communications between CDN servers and/or across the overlay may be enhanced using improved route selection, protocol optimizations including TCP enhancements, persistent connection reuse and pooling, content & header compression and de-duplication, and other techniques such as those described in U.S. Pat. Nos. 6,820,133, 7,274,658, 7,607,062, and 7,660,296, among others, the disclosures of which are incorporated herein by reference.

As an overlay offering communication enhancements and acceleration, the CDN platform may be used to facilitate wide area network (WAN) acceleration services between enterprise data centers and/or between branch-headquarter offices (which may be privately managed), as well as to/from third party software-as-a-service (SaaS) providers used by the enterprise users.

In this vein CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud (e.g., from a SaaS provider).

Computer Based Implementation

The subject matter described herein may be implemented with computer systems, as modified by the teachings hereof, with the processes and functional characteristics described herein realized in special-purpose hardware, general-purpose hardware configured by software stored therein for special purposes, or a combination thereof.

Software may include one or several discrete programs. A given function may comprise part of any given module, process, execution thread, or other such programming construct. Generalizing, each function described above may be implemented as computer code, namely, as a set of computer instructions, executable in one or more microprocessors to provide a special purpose machine. The code may be executed using conventional apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 7:
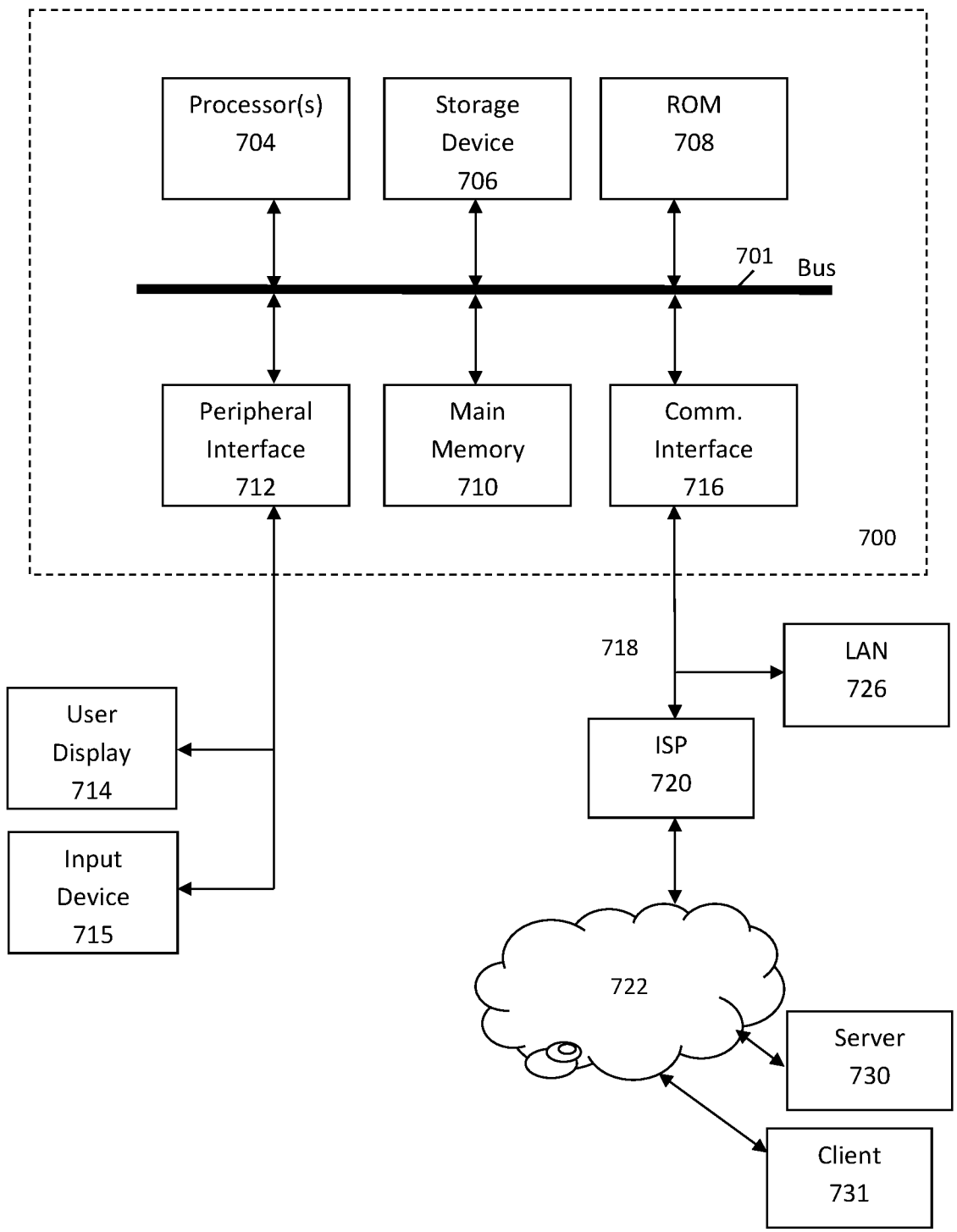

FIG. 7 is a block diagram that illustrates hardware in a computer system 700 on which embodiments of the invention may be implemented. The computer system 700 may be embodied in a client device, server, personal computer, workstation, tablet computer, wireless device, mobile device, network device, router, hub, gateway, or other device.

Computer system 700 includes a microprocessor 704 coupled to bus 701. In some systems, multiple microprocessor and/or microprocessor cores may be employed. Computer system 700 further includes a main memory 710, such as a random access memory (RAM) or other storage device, coupled to the bus 701 for storing information and instructions to be executed by microprocessor 704. A read only memory (ROM) 708 is coupled to the bus 701 for storing information and instructions for microprocessor 704. As another form of memory, a non-volatile storage device 706, such as a magnetic disk, solid state memory (e.g., flash memory), or optical disk, is provided and coupled to bus 701 for storing information and instructions. Other application-specific integrated circuits (ASICs), field programmable gate arrays (FPGAs) or circuitry may be included in the computer system 700 to perform functions described herein.

Although the computer system 700 is often managed remotely via a communication interface 716, for local administration purposes the system 700 may have a peripheral interface 712 communicatively couples computer system 700 to a user display 714 that displays the output of software executing on the computer system, and an input device 715 (e.g., a keyboard, mouse, trackpad, touchscreen) that communicates user input and instructions to the computer system 700. The peripheral interface 712 may include interface circuitry and logic for local buses such as Universal Serial Bus (USB) or other communication links.

Computer system 700 is coupled to a communication interface 716 that provides a link between the system bus 701 and an external communication link. The communication interface 716 provides a network link 718. The communication interface 716 may represent an Ethernet or other network interface card (NIC), a wireless interface, modem, an optical interface, or other kind of input/output interface.

Network link 718 provides data communication through one or more networks to other devices. Such devices include other computer systems that are part of a local area network (LAN) 726. Furthermore, the network link 718 provides a link, via an internet service provider (ISP) 720, to the Internet 722. In turn, the Internet 722 may provide a link to other computing systems such as a remote server 730 and/or a remote client 731. Network link 718 and such networks may transmit data using packet-switched, circuit-switched, or other data-transmission approaches.

In operation, the computer system 700 may implement the functionality described herein as a result of the microprocessor executing program code. Such code may be read from or stored on a non-transitory computer-readable medium, such as memory 710, ROM 708, or storage device 706. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 718 (e.g., following storage in an interface buffer, local memory, or other circuitry).

A client device may be a conventional desktop, laptop or other Internet-accessible machine running a web browser or other rendering engine, but as mentioned above a client may also be a mobile device. Any wireless client device may be utilized, e.g., a cellphone, pager, a personal digital assistant (PDA, e.g., with GPRS NIC), a mobile computer with a smartphone client, tablet or the like. Other mobile devices in which the technique may be practiced include any access protocol- enabled device (e.g., iOS™-based device, an Android™-based device, other mobile-OS based device, or the like) that is capable of sending and receiving data in a wireless manner using a wireless protocol. Typical wireless protocols include: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP. The WAP (wireless access protocol) also provides a set of network communication layers (e.g., WDP, WTLS, WTP) and corresponding functionality used with GSM and CDMA wireless networks, among others.

In a representative embodiment, a mobile device is a cellular telephone that operates over GPRS (General Packet Radio Service), which is a data technology for GSM networks. Generalizing, a mobile device as used herein is a 3G—(or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards. The teachings disclosed herein are not limited to any particular mode or application layer for mobile device communications.

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A multipath content delivery system for serving content via a plurality of differing network paths to a client device, comprising:

a content server comprising a first computer machine with a first processor and memory storing program instructions that execute on the first processor to modify a markup language document to have first and second universal resource locators (URLs) for the same object;

a domain name system (DNS) server comprising a second computer machine with a second processor and memory storing program instructions that execute on the second processor for resolving hostnames, the DNS server configured to resolve the hostname of the first URL to a first IP address associated with the content server, and the DNS server configured to resolve the hostname of the second URL to a second IP address associated with the content server;

wherein the first IP address is associated with a first network interface of the content server and the second IP address is associated with a second network interface of the content server, the content server having connectivity to at least two networks as a result of the first and second network interfaces;

the client device comprising a third processor and memory storing program instructions that execute on the third processor to process the markup language document as modified by the content server, where the markup language document comprises the first and the second URLs, both for the same object, contact the DNS server to resolve the hostname of the first URL to the first IP address and to resolve the hostname of the second URL to the second IP address; and, the memory of the client device further storing program instructions to execute on the processor to generate and send, in response to the first and second URLs for the same object, at least a first and a second request for the same object, wherein the first request is sent to the first IP address and the first network interface of the content server, and the second request is sent to the second IP address and the second network interface of the content server, thereby invoking multipath content delivery.

2. The system of claim 1, wherein the memory of the client device stores program instructions to receive at least two copies of the same object in response to the first and second requests, and to use only the first copy received when rendering a web page described by the markup language document.

3. The system of claim 1, wherein the client device uses a first network interface of the client device for the first request and a second network interface of the client device for the second request, wherein the first network interface comprises a WiFi network interface and the second network interface comprises a cellular network interface.

4. The system of claim 3, wherein the client device has a third IP address associated with its first network interface and a fourth IP address associated with its second network interface.

5. The system of claim 1, wherein the content server stores program instructions to parse the markup language document to find a particular URL for a particular object, and to convert the particular URL for the particular object into the first and second URLs for the same object, the same object being the particular object, and then serve the markup language document to the client device.

6. The system of claim 1, wherein the markup language document is an HTML document.

7. The system of claim 1, wherein the memory of the content server stores program instructions to parse the markup language document to find a particular URL for a particular object, and to insert a script into the markup language document that instructs the client device to make requests for the same object, which is the particular object, using the first and second URLs.

8. A multipath content delivery system for serving content via a plurality of differing network paths to a client device, comprising:
   a content server comprising a first computer machine with a first processor and memory storing program instructions that execute on the first processor to modify a markup language document to have first and second universal resource locators (URLs) for the same object;
   a domain name system (DNS) server comprising a second computer machine with a second processor and memory storing program instructions that execute on the second processor for resolving hostnames, the DNS server configured to resolve a hostname of the first URL to a first IP address associated with the content server, and the DNS server configured to resolve a hostname of the second URL to a second IP address associated with the content server;
   wherein the memory of the content server stores program instructions to (i) parse the markup language document to find a particular URL for a particular object and to convert the particular URL for the particular object into the first and second URLs for the same object, the same object being the particular object, the hostname of the first URL resolving to the first IP address associated with the content server and the hostname of the second URL resolving to the second IP address associated with the content server, thereby creating a modified markup language document, and to (ii) send the modified markup language document to a client device in response to a request for the markup language document from the client device;
   wherein the memory of the DNS server stores program instructions to (iii) receive a first DNS request originating from the client device to resolve the hostname of the first URL, and resolve the hostname of the first URL to the first IP address, and (iv) receive a second DNS request originating from the client device to resolve the hostname of the second URL, and resolve the hostname of the second URL to the second IP address;
   wherein the first IP address is associated with a first network interface of the content server and the second IP address is associated with a second network interface of the content server, the content server having connectivity to at least two networks as a result of the first and second network interfaces; and,
   wherein the content server memory stores program instructions to receive a first and a second request for the same object from a client device, the first request being received by the content server at the first IP address and the first network interface of the content server, and the second request being received by the content server at the second IP address and the second network interface of the content server, thereby invoking multipath content delivery.

9. The system of claim 8, wherein the content server memory stores program instructions to receive at least two copies of the same object in response to the first and second requests, and use only the first copy received when rendering a web page described by the markup language document.

10. The system of claim 8, wherein the markup language document is an HTML document.

11. The system of claim 8, wherein the content server memory stores program instructions to parse the markup language document to find the particular URL for the particular object, and to insert a script into the markup language document that instructs the client device to make two requests for the same object, which is the particular object, using the first and second URLs.

12. The system of claim 8, wherein the content server memory stores program instructions to:
   prior to modifying the markup language document, determining whether the particular object is cacheable at the content server, and deciding to modify the markup language document based on said determination.

13. A method for multipath content delivery, comprising:
   parsing a markup language document to find a particular universal resource locator (URL) for a particular object;
   converting the particular URL for the particular object into first and second URLs for the particular object, the first URL having a first hostname and the second URL having a second hostname, thereby creating a modified markup language document;
   sending the modified markup language document to a client device in response to a request from the client device for the markup language document;
   receiving a first domain name system (DNS) request to resolve the first hostname, and resolving the first hostname to a first IP address associated with a content server;
   receiving a second DNS request to resolve the second hostname, and resolving the second hostname to a second IP address associated with the content server;
   wherein the first IP address is associated with a first network interface of the content server and the second IP address is associated with a second network interface of the content server, the content server having connectivity to at least two networks as a result of the first and second network interfaces;

receiving a first request for the particular object at the content server at the first IP address and the first network interface of the content server; and, receiving a second request for the particular object at the content server at the second IP address and the second network interface of the content server, thereby invoking multipath content delivery.

14. The method of claim 13, further comprising parsing the markup language document to find the particular URL for the particular object, and inserting a script into the markup language document that instructs the client device to make requests for the particular object using the first and second URLs.

15. The method of claim 13, further comprising, prior to modifying the markup language document, determining whether the particular object is cacheable at the content server, and deciding to modify the markup language document based on said determination.

* * * * *